United States Patent [19]

Martin

[11] Patent Number: 5,033,784
[45] Date of Patent: Jul. 23, 1991

[54] MOLD BALANCING LIFTING BAR

[75] Inventor: Roger G. Martin, Greenville, Mich.

[73] Assignee: Master Unit Die Products, Inc., Greenville, Mich.

[21] Appl. No.: 529,718

[22] Filed: May 30, 1990

Related U.S. Application Data

[63] Continuation of Ser. No. 351,450, May 15, 1989, abandoned.

[51] Int. Cl.$^5$ .............................................. B66C 1/10
[52] U.S. Cl. ..................................... 294/91; 294/81.3
[58] Field of Search ............... 294/90, 91, 81.3, 81.4, 294/81.41, 67.21, 67.5, 82.12; 425/192 R, 195; 52/125.2, 125.3, 125.6; 269/60, 136

[56] References Cited

U.S. PATENT DOCUMENTS

| | | | |
|---|---|---|---|
| 849,623 | 4/1907 | Killian | 294/91 |
| 2,153,474 | 4/1939 | Naylor et al. | 294/91 X |
| 3,548,465 | 12/1970 | Workman | 294/82.17 |
| 4,058,339 | 11/1977 | Burchard, Jr. | 294/91 |
| 4,194,868 | 3/1980 | Walker et al. | 294/90 X |
| 4,500,275 | 2/1985 | Ruhl | 425/195 X |
| 4,702,456 | 10/1987 | Von Holdt | 249/165 |
| 4,753,415 | 6/1988 | Von Holdt | 249/163 X |

Primary Examiner—Margaret A. Focarino
Assistant Examiner—Dean J. Kramer
Attorney, Agent, or Firm—Price, Heneveld, Cooper, DeWitt & Litton

[57] ABSTRACT

A method to facilitate the movement of heavy molds for use in an injection molding machine employing load bearing lugs on each mold half and a lifting bar which receives and supports the lugs and mold. In the method, the lifting tool is slid over the lugs. The tool and mold is then raised and lowered until the balance point is found. The lifting bar is then clamped in place on the lugs so that the mold can be safely raised and inserted into an injection molding machine. The balanced mold can be easily moved in and out of the guide rails of the injection molding machine since it is presented as a balanced load with no tendency to bind in the machine.

8 Claims, 3 Drawing Sheets

MOLD BALANCING LIFTING BAR

This is a continuation of co-pending application Ser. No. 07/351,450 filed on May 15, 1989 now abandoned.

BACKGROUND OF THE INVENTION

In the process of injection molding, a heavy metal mold is used to contain the pressure of the fluid plastic material. The mold halves are positioned in the injection molding machine and held in guide rails by suitable clamps. In view of the heavy weight of the mold, it is difficult to place the mold into the injection molding machine and to remove the mold from the machine when the machine is to be used to form a different part. If the mold is not raised and lowered carefully in the guide rails, the mold will tend to bind against the rails and, in view of the heavy weight, become very difficult to move without damaging the mold or the injection molding machine.

SUMMARY OF THE INVENTION

The present invention relates to a device to facilitate the insertion and removal of a mold from an injection molding machine. In accordance with the embodiment of the invention disclosed herein, each half of a mold has a load bearing lug positioned on its upper surface. A lifting member or bar is then slid over the lifting lugs. The lifting bar is then moved back and forth over the contained load bearing lugs and tested until a balanced position is found. When the mold is precisely balanced in the lifting bar, a clamp actuating member is brought to bear on a clamp surface within the lifting bar to securely hold the load bearing lugs and their associated mold halves in position. At least one end of the lifting bar is provided with a latch while the other end is closed off to keep the mold pieces from coming loose during lifting. When the balanced position of the mold and the lifting bar has been determined, the lifting bar or mold can be marked to reproduce this position. After the balancing test is completed, the lifting bar and clamped mold can be raised as a unitary member and brought to the injection molding machine where it can be slid into the guide rails in the machine. Since the mold is in a vertically balanced position, the tendency for the mold to tilt or cock to jam in the guide rails is substantially reduced. The mold can freely slide into the machine and, at the completion of the injection molding process, the lifting tool can be brought back to the machine and fastened to the mold at the previously determined balanced position. The lifting tool is again clamped to the load bearing lugs and the unitary assembly can be drawn out of the injection molding machine, again, without fear that the unit will bind within the guide rails of the machine.

Since the balance point for the mold is dependent on the mass of the mold, which is in turn dependent on the shape of the cavity, the balance point for the assembly has to be determined both laterally and orthogonally with respect to the guide rails in the injection molding machine. The lateral balancing point can be determined by sliding the load bearing lugs within the lifting bar. The orthogonal load bearing point can be determined by fixing the load bearing lugs to the top of the mold so that they can be moved in an eccentric path about a suitable bolt or other fastener.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION

Figure 1:
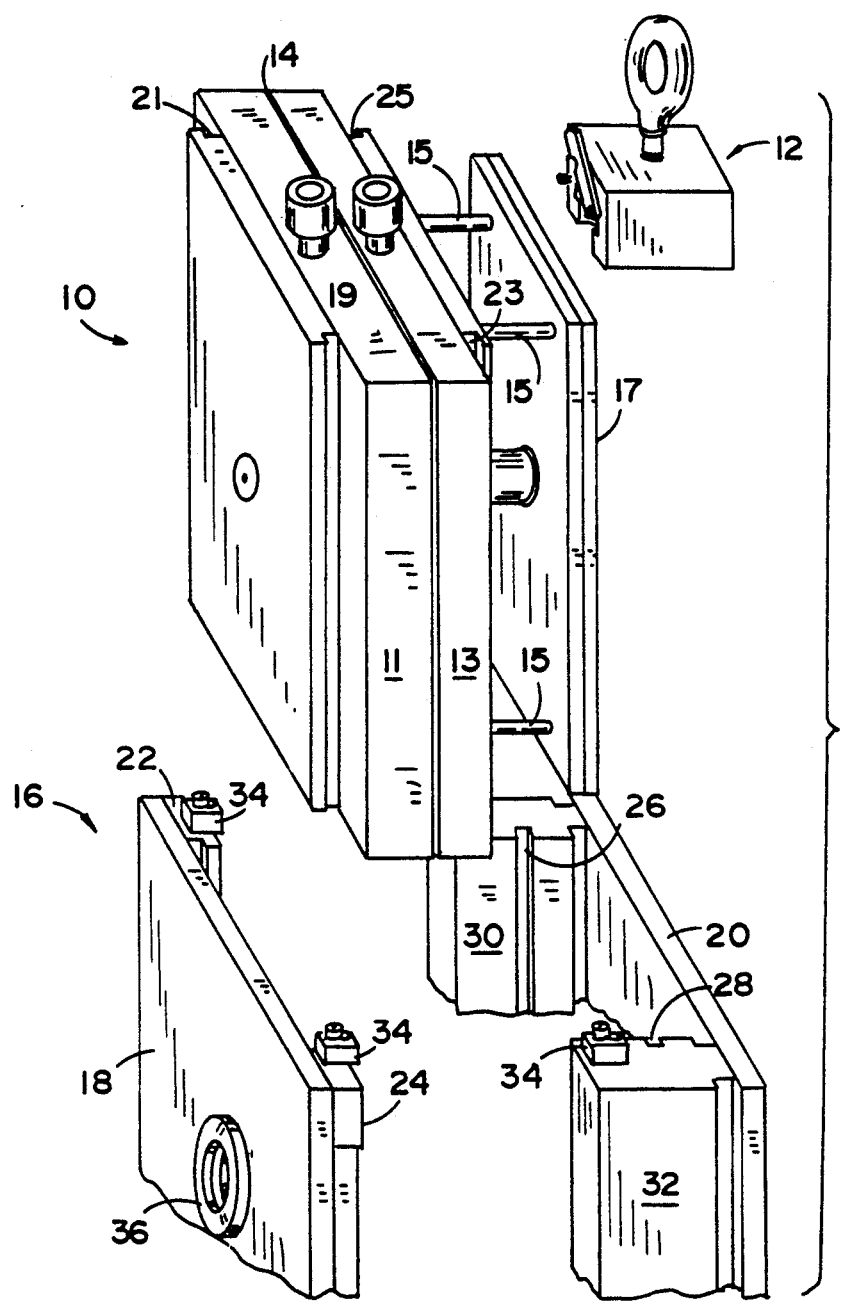
FIG. 1 is an exploded perspective view showing the respective position of the lifting tool, a T style unit mold, and U-frame for the injection molding machine before combining the several units.

In order to place the present invention into its operating environment, reference should be had to FIG. 1 which shows a T style unit mold 10, which will be supported by a lifting bar 12, in space above the plates and guide rails of a U-frame unit mold base 16. The frame, as will be readily appreciated by those skilled in the art, is received by opposite platens of an injection molding machine. In this view and throughout the several views, like parts will be assigned like reference numerals.

As can be seen from FIG. 1, the T style unit mold is a large unbalanced assembly which is difficult to move in and out of the frame. The mold is made up of a left mold half 11 which is joined to a right mold half 13 along the parting face 14. On the back of the mold half 13 and cooperating with it are shown ejector pins 15 attached to an ejector plate 17. When the mold halves are separated along the parting line 14, the ejector plate and pins move to push the finished part out of the mold.

The injection molding machine has affixed to the platens a left mold frame 18 and a right mold frame 20. The frame 18 supports the spaced rail plates 22 and 24 into which the guide portions 19 and 21 on mold half 11 are positioned. In a similar manner, guides 23 and 25 and mold half 13 are placed into guide rails 26 and 28 in rail plates 30 and 32. After the mold is in position, clamps 34 hold the mold halves in place. Liquid plastic can then be injected into the mold 10 through sprue opening 36.

Figure 2:
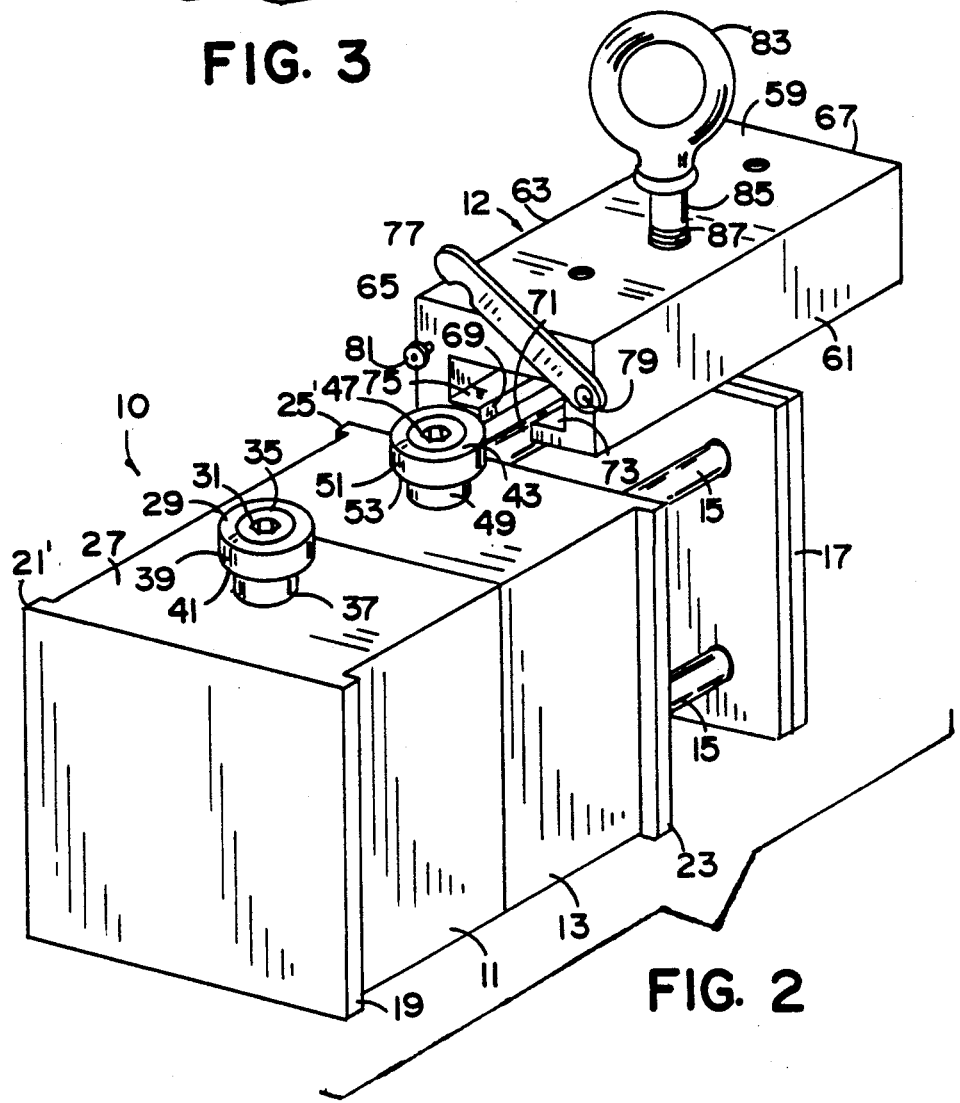
FIG. 2 shows the lifting bar positioned above a mold also adapted for receipt in a U-frame.

Referring now to FIG. 2, which shows the lifting bar in use with a unit mold, a mold 10 is shown having a left mold half 11' and a right mold half 13'. As previously mentioned, the mold is also equipped with ejector pins 15' and an ejector plate 17'. These parts 11', 13', 15', and 17' make up a mold which is placed directly into and removed directly from the U-frame mounted on the platens of an injection molding machine. As shown in FIG. 2, the left half of the mold 11' has guide portions 19' and 21' along each side of the mold face for entering into a corresponding guide rail in the left frame in the injection molding machine. The right half of the mold includes, as one assembly, the mold face 13', ejector pins 15' and ejector plate 17'. The right mold half also has suitable guide portions 23' and 25' along opposed opposite rear edges for receipt by corresponding guide rails in the right frame in the injection molding machine. The right mold section, as in the left, is held in the injection molding machine by means of these guide portions.

As is apparent from FIGS. 1 and 2, there is an obvious mass imbalance in a mold between the left and right halves. In view of this and in view of the mass of the mold, great care must be exercised when attempting to insert or remove the mold from an injection molding machine. In order to overcome this problem and in accordance with the present invention, the top surface 27 of the left mold face 11' has a load bearing lug 29 mounted thereon by a suitable bolt, screw or other means 31 set within a recess 35. In cross section, the load bearing lug 29 is substantially "T"-shaped, having a reduced portion 37 which functions as a guide and an enlarged portion 39, the lower surface 41 of which acts as a load bearing surface when the load bearing lug is supported in the lifting bar.

The right mold face has a substantially similar load bearing lug 43 fastened to the top surface by a suitable bolt 47 or other means. Like the load bearing lug 29, the load bearing lug 43 also has a reduced portion 49 which functions as a guide and an enlarged portion 51 having a load bearing surface 53.

The lifting bar 12, as shown in the preferred embodiment, is of a substantially rectangular open box-like or channel configuration having a top surface 59, opposed sides 61 and 63 and opposed end faces 65 and 67. The lower portion of the lifting bar, as shown in FIG. 2, has opposed guide edges 69 and 71 and load bearing surfaces 73 and 75. At the end of the load bearing bar 12 is mounted a keeper 77 which pivots about a pin 79 fixed on the end face 65. A stop 81 is mounted on the end face 65 opposite the pivot 79 to enable the keeper 77 to close the end opening in the lifting bar 12. The opposite end of the lifting bar can have a similar keeper or can permanently be closed off. It is preferred to have two latches on the lifting bar to facilitate use of the bar.

Centrally located on the top surface 59 of the lifting bar 12 is a lifting ring 83 which is supported by a threaded portion 85 which screws into a threaded opening 87. Other tools or members can be used to support the lifting bar. For example, a hook or bolt can be used. In view of the substantial mass involved in a mold, the lifting lugs and the lifting bar and support ring are preferably made of heavy steel. Other materials can also be used that can stand the weight associated with the unit mold.

Figure 3:
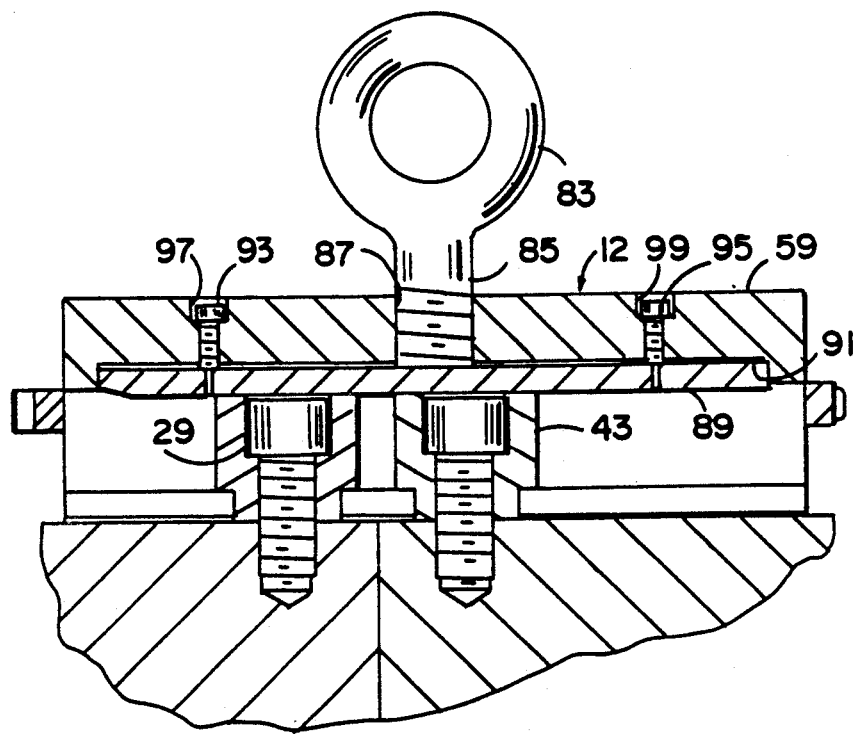
FIG. 3 is a sectional view of the lifting bar showing an embodiment of a clamp.

In FIG. 3, the lifting bar 12 is shown in position containing the lifting lugs 29 and 43. Abutting the top surfaces of the lifting lugs is a clamp face 89 which is contained within an elongated recessed area 91 on the inside surface of the top portion 59. The clamp 89 is normally held within the lifting bar by a pair of threaded screws or bolts 93 and 95 which are mounted in apertures 97 and 99, respectively, which pass through top portion 59. The lower portions of the bolts 93 and 95 are fastened to the clamp face 89 and support the clamp face when not in use. When in use, as shown in FIG. 3, the clamp face rests upon the top of the load carrying lugs and is held tightly in position by the threaded portion 85 of the lifting ring 83 which is tightly fastened down upon the load bearing lugs to securely hold them in position to prevent the mold halves from sliding within the lifting bar.

In operation, the two mold faces making up the mold are joined along their parting face, as shown in FIGS. 1 and 2. The lifting tool is then slid over the lifting lugs 29 and 43 (FIG. 2) and the latch 77 is closed. The lifting bar and the mold are then raised and lowered by a means of a chain fall or other suitable lifting device attached to the ring 83. The mold is tested in this manner within the lifting bar until a balanced position is obtained. After the balance point is determined, the lifting ring is turned to screw the threaded portion 85 tightly into the lifting bar, forcing the clamp face 89 to securely grip the lifting lugs 29 and 43 on the top surface of the mold halves. During the testing process and during movement of the mold, the keeper on the lifting bar is closed to avoid damage to the mold due to slippage of the lifting lugs within the lifting bar.

Figure 4:
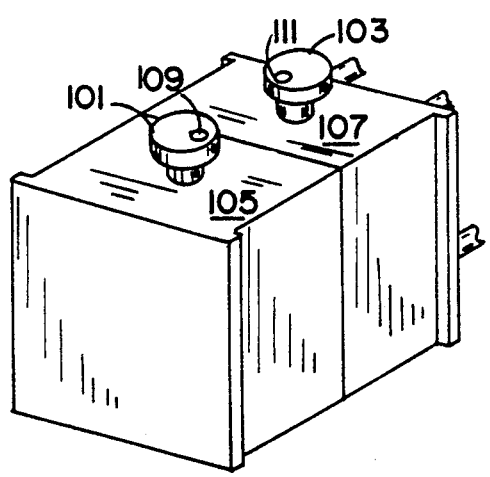
FIG. 4 shows the load bearing lugs mounted for eccentric rotation about their respective supports.

As described thus far, the lifting bar will determine a lateral balance point for the mold. The mold, however, can still be hanging at an angle from the support ring due to a mass imbalance within the mold. In order to overcome this further mass imbalance and now referring to FIG. 4, the lifting lugs 101 and 103 can be joined to the respective mold halves 105 and 107 by a bolt or fastener 109 and 111 similar to that disclosed in the embodiment of FIG. 2. It can be seen in FIG. 4, however, that the bolts 109 and 111 are not centrally positioned within the lifting lugs. In this embodiment of the present invention, the bolts are positioned off center relative to the lifting lug so that the lifting lugs can move in an eccentric path about their respective supports. By means of this eccentric mounting, the mold can be precisely balanced in a direction orthogonal to the original or lateral balance point precisely aligning the guide portions on the mold faces for insertion into the corresponding guide rails in the injection molding machine.

Figure 5:
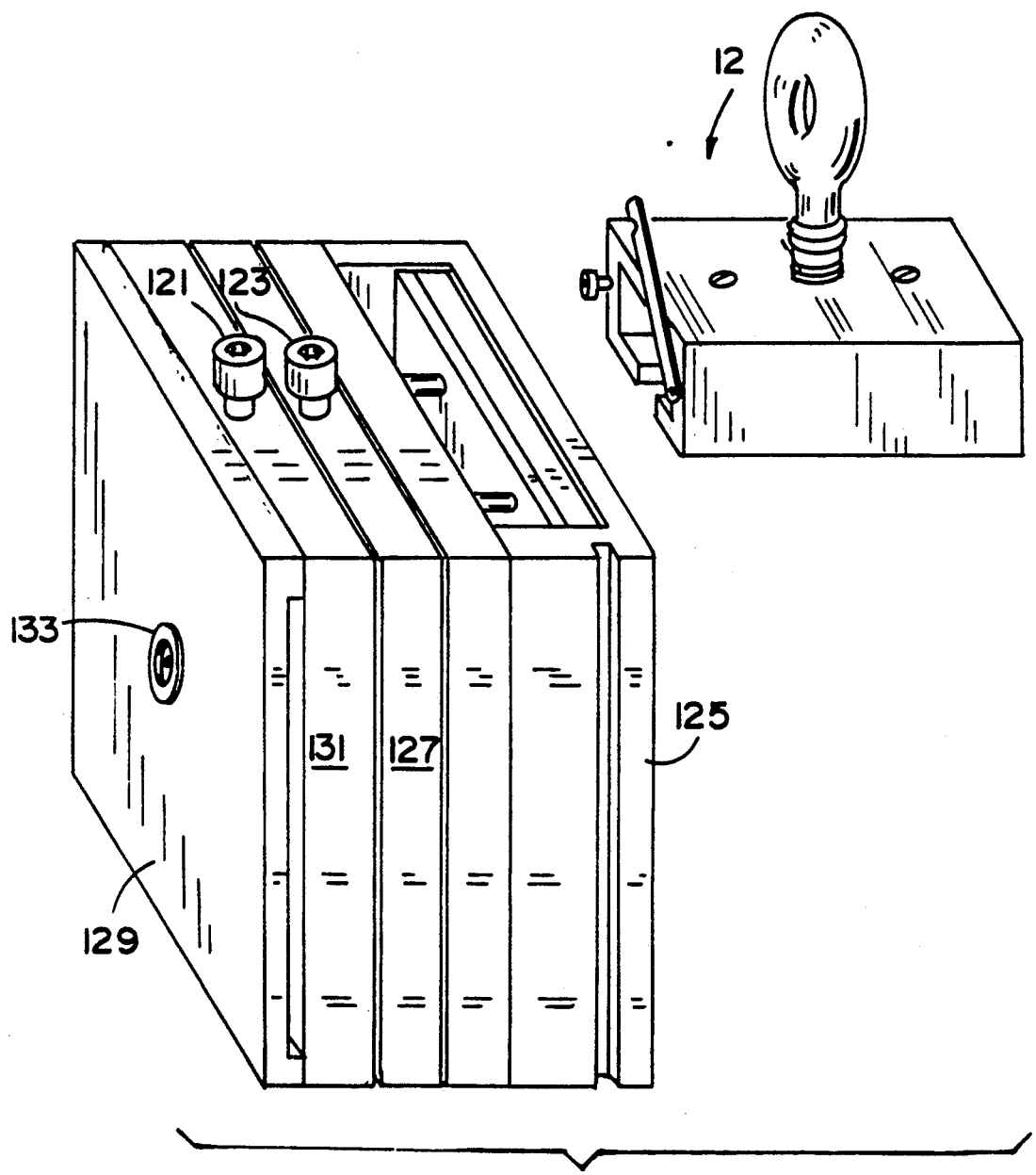
FIG. 5 shows the lifting bar aligned with the lifting lugs on a mold with a standard mold base.

The lifting bar of the present invention is not limited to use with unit molds. As shown in FIG. 5, the lifting bar 12 is aligned with the lifting lugs 121 and 123 on a mold having a standard mold base. In this type of mold, an ejector box 125 is attached to the right mold half 127 and a platen plate 129 is attached to the left mold half 131. In view of the obvious mass imbalance in this style mold, it is normally very difficult to properly position the mold and the aligning ring 133 in the platens of the injection molding machine. Through the use of the lifting bar 12, the mass of the mold can be balanced and controlled during the insertion and removal of this type of mold and mold base from an injection molding machine.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

The embodiments of the invention in which an exclusive property or privilege is claimed are defined as follows:

1. A balancing and lifting apparatus to facilitate the loading of a mold into an injection molding machine comprising:
    at least one load bearing means for detachable mounting on each mold half, each load bearing means being substantially T-shaped, having a reduced portion which functions as a guide and an enlarged portion, the lower surface of which functions as a load bearing surface; and
    lifting means including a channel for slidably and adjustably receiving said load bearing means when mounted on each half of said mold for lifting and laterally balancing said mold while supported by said load bearing surfaces on said load bearing means.

2. A balancing and lifting apparatus as set forth in claim 1 including clamping means disposed within said lifting means for securing said load bearing means in said lifting means after the balanced position is determined.

3. A balancing and lifting apparatus as set forth in claim 2 wherein said load bearing means on said mold halves are adjustable to enable said mold to be balanced in a direction orthogonal to the balance position determined by said lifting means.

4. A mold lifting apparatus comprising:
a channel shaped member having opposed load bearing guide members;
a moveable clamp face within said channel shaped member above said load bearing guide members;
a lifting tool adjustably mounted on the top of said channel shaped member and adapted to move said moveable clamp face into clamping relationship by means of a threaded shank on said lifting tool which is threaded through the top portion of said channel shaped member to bear upon said clamp face;
at least one load bearing lug for mounting on an upper surface of a mold and adapted to be slidably received within said channel shaped member and positioned to balance the weight of said mold supported by said load bearing guide members when said channel shaped member is supported by said lifting tool.

5. A balanced mold lifting apparatus as set forth in claim 4 wherein said load bearing lugs can be fastened to each half of said mold by a bolt centrally positioned through said lug and into the top of the mold half.

6. A balanced mold lifting apparatus as set forth in claim 4 wherein said load bearing lugs can be fastened to each half of a mold by a bolt positioned off center relative to the center of said lug to enable said lug to move in an eccentric path about said bolt.

7. A method for balancing a mold to facilitate the loading of a mold into an injection molding machine comprising the following steps:
providing a load bearing lug for mounting on each half of the mold;
providing a tool for adjustably receiving and supporting the mold by said load bearing lugs;
testing for the balance point of said mold and said tool by raising and lowering said mold with said tool and noting the direction said tool has to be moved relative to said lugs;
balancing said mold and said tool by moving said load bearing tool over said lugs until the balance point is found;
clamping said load bearing lugs in said tool to maintain the balanced position;
lifting said tool and mold; and
lowering said mold into guide rails of the injection molding machine.

8. A method for balancing and controlling the mass of a mold for an injection molding machine to facilitate the insertion of the mold into the machine comprising the steps of:
a) providing load bearing lugs on each half of the mold;
b) providing a tool adapted to slidably receive said lugs;
c) sliding said tool over said lugs;
d) lifting said tool and noting the direction of imbalance;
e) lowering said tool to relieve the weight from said lugs;
f) moving said tool on said lugs in the direction needed to balance the mold;
g) lifting said tool to determine if the mold is balanced;
h) repeating steps d), e), f), and g) until the balance point for the mold is found;
i) clamping said lugs in said tool so said lugs cannot shift during handling; and
j) raising said balanced mold and lowering said mold into guide rails of an injection molding machine.

* * * * *

UNITED STATES PATENT AND TRADEMARK OFFICE
CERTIFICATE OF CORRECTION

PATENT NO. : 5,033,784

DATED : July 23, 1991

INVENTOR(S) : Roger G. Martin

It is certified that error appears in the above-identified patent and that said Letters Patent is hereby corrected as shown below:

Col. 4, line 34
"haVing" should be --having--

Signed and Sealed this

Thirteenth Day of June, 1995

Attest:

BRUCE LEHMAN

Attesting Officer

Commissioner of Patents and Trademarks